Patented Oct. 6, 1953

2,654,740

UNITED STATES PATENT OFFICE 2,654,740

2-HYDROXY-3,3,3-TRICHLORO-1-AMINO-PROPANE SALT OF PENICILLIN

Harley W. Rhodehamel, Jr., Indianapolis, Ind., assignor to Eli Lilly and Company, Indianapolis, Ind., a corporation of Indiana No Drawing. Application February 13, 1952, Serial No. 271,430

2 Claims. (Cl. 260—239.1)

This invention relates to a novel penicillin salt and the preparation thereof.

I have discovered that 2-hydroxy-3,3,3-trichloro-1-aminopropane or its salts can be combined with penicillin or its salts by neutralization or metathetical reactions to form a sparingly soluble penicillin salt, thereby affording a means of precipitating penicillin from solution, and of purifying penicillin. Moreover, the novel penicillin salt can be utilized therapeutically. A prolonged penicillin blood level can be secured upon administering the salt parenterally by methods known to the medical art.

The following examples illustrate the preparation of the novel salt of this invention:

Example 1

To a solution of .3 g. of penicillin (e. g. a commercial mixture of the several penicillins) dissolved in 1.8 ml. of amyl acetate are added .3 g. of 2-hydroxy-3,3,3-trichloro-1-aminopropane dissolved in 15 ml. of amyl acetate. The mixture is cooled and stirred occasionally whereupon the 2-hydroxy-3,3,3-trichloro-1-aminopropane salt of penicillin precipitates. The salt is isolated as by decantation or filtration, and dried in vacuo.

The salt is represented by the following formula in which P represents penicillin:

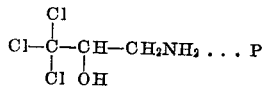

Example 2

To an aqueous solution of 1 g. of the potassium salt of penicillin G in 5 ml. of water is added a solution of 1 g. of 2-hydroxy-3,3,3-trichloro-1-aminopropane hydrochloride in 10 ml. of water. The mixture is cooled and stirred occasionally whereupon the slightly soluble 2-hydroxy-3,3,3-trichloro-1-aminopropane salt of penicillin G precipitates. The salt is separated, and dried in vacuo.

I claim:

1. The 2-hydroxy-3,3,3-trichloro-1-aminopropane salt of penicillin represented by the following formula in which P represents penicillin:

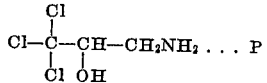

2. The 2-hydroxy-3,3,3-trichloro-1-aminopropane salt of penicillin G.

HARLEY W. RHODEHAMEL, Jr.

References Cited in the file of this patent

UNITED STATES PATENTS

| Number | Name | Date |
|---|---|---|
| 2,587,574 | Young | Feb. 26, 1952 |

OTHER REFERENCES

British Report CMR—Br. 234 (PB 79,927), Dec. 5, 1947, p. 3.